US012053976B2

(12) United States Patent
Kawajiri

(10) Patent No.: US 12,053,976 B2
(45) Date of Patent: Aug. 6, 2024

(54) PRINTING APPARATUS AND ESTIMATION METHOD

(71) Applicant: SEIKO EPSON CORPORATION, Tokyo (JP)

(72) Inventor: Masahiro Kawajiri, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 85 days.

(21) Appl. No.: 18/055,014

(22) Filed: Nov. 14, 2022

(65) Prior Publication Data

US 2023/0150279 A1 May 18, 2023

(30) Foreign Application Priority Data

Nov. 15, 2021 (JP) ................................ 2021-185439

(51) Int. Cl.
*B41J 11/42* (2006.01)

(52) U.S. Cl.
CPC .................................... *B41J 11/42* (2013.01)

(58) Field of Classification Search
CPC ........ B41J 11/42; B41J 15/04; B41J 11/0075; B65H 2402/31; B65H 2404/143; B65H 2404/612; B65H 2553/412; B65H 26/06; B65H 2511/114; B65H 2511/14; B65H 2511/212; B65H 2511/514; B65H 2513/11; B65H 2701/192; B65H 2801/15
See application file for complete search history.

(56) References Cited

U.S. PATENT DOCUMENTS

2011/0199415 A1* 8/2011 Taniguchi ................ B41J 11/46
347/16

FOREIGN PATENT DOCUMENTS

JP H7-172683 A 7/1995

* cited by examiner

*Primary Examiner* — Justin Seo
(74) *Attorney, Agent, or Firm* — WORKMAN NYDEGGER

(57) ABSTRACT

A rebel printer includes an estimation unit that estimates a remaining amount of a roll sheet based on R=PF/(π·REV) (Equation (1)). A first measurement unit resets the measured cumulative rotation amount each time the remaining amount of the roll sheet is estimated or each time the remaining amount of the roll sheet is estimated multiple times, A second measurement unit resets the measured cumulative conveyance amount each time the remaining amount of the roll sheet is estimated or each time the remaining amount of the roll sheet is estimated multiple times, and the estimation unit performs a filter process on A diameter of the roll sheet calculated using the Equation (1), and estimates the diameter subjected to the filter process as the remaining amount of the roll sheet.

6 Claims, 8 Drawing Sheets

PRINTING APPARATUS AND ESTIMATION METHOD

The present application is based on, and claims priority from JP Application Serial Number 2021-185439, filed Nov. 15, 2021, the disclosure of which is hereby incorporated by reference herein in its entirety.

BACKGROUND

1. Technical Field

The present disclosure relates to a printing apparatus and an estimation method.

2. Related Art

In the related art, a technique of estimating the remaining amount of a roll sheet is known.

As a technique of estimating the remaining amount of a roll sheet, JP-A-7-172683 discloses a technique of computing the remaining amount of a rolled recording medium from a reflection sensor that generates a detection signal each time the rolled recording medium is rotated by a predetermined amount, and the number of driving pulses for a driving motor of a recording sheet feed roller in the detection signal generation cycle of the reflection sensor.

The computation in JP-A-7-172683 utilizes a fact that there is a proportional relationship between the rotation amount of the rolled recording medium and the conveyance amount of the roll sheet recording medium. However, in a printing apparatus that performs printing on a roll sheet as that disclosed in JP-A-7-172683, the rotation amount of the roll sheet and the conveyance amount of the printing medium fed from the roll sheet are not necessarily proportional to each other. For example, to maintain the conveyance amount of the printing medium at a certain conveyance amount, it is necessary to increase the rotation amount of the roll sheet as the diameter of the roll sheet decreases. As described above, the computation in JP-A 172683 utilizes a fact that there is a proportional relation between the rotation amount of the rolled recording medium and the conveyance amount of roll sheet recording medium, and as such the remaining amount of the rolled recording medium may not be accurately computed.

SUMMARY

A printing apparatus of an aspect to solve the above-mentioned problems includes a feed mechanism configured to feed a printing medium from a roll sheet by rotating the roll sheet, a conveyance mechanism configured to convey the printing medium fed by the feed mechanism, a printing unit configured to perform printing on the printing medium conveyed by the conveyance mechanism, a first measurement unit configured to measure a cumulative rotation amount, the cumulative rotation amount being a cumulative value of a rotation amount of the roll sheet, a second measurement unit configured to measure a cumulative conveyance amount, the cumulative conveyance amount being a cumulative value of a conveyance amount of the printing medium conveyed by the conveyance mechanism, and an estimation unit configured to estimate a remaining amount of the roll sheet by using the following Equation (1): $R=PF/(\pi \cdot REV)$ . . . Equation (1), where the cumulative rotation amount measured by the first measurement unit is REV, the cumulative conveyance amount measured by the second measurement unit is PF, a diameter of the roll sheet is R, and $\pi$ is a ratio of a circumference of a circle to its diameter. The first measurement unit resets the measured cumulative rotation amount each time the estimation unit estimates the remaining amount of the roll sheet or each time the estimation unit estimates the remaining amount of the roll sheet multiple times, the second measurement unit resets the measured cumulative conveyance amount each time the estimation unit estimates the remaining amount of the roll sheet or each time the estimation unit estimates the remaining amount of the roll sheet multiple times, and the estimation unit calculates the diameter of the roll sheet with the Equation (1), performs a filter process on the diameter of the roll sheet calculated, and estimates the diameter of the roll sheet subjected to the filter process as the remaining amount of the roll sheet.

An estimation method of another aspect to solve the above-mentioned problems is a method of a printing apparatus, the printing apparatus including a feed mechanism configured to feed a printing medium from a roll sheet by rotating the roll sheet, a conveyance mechanism configured to convey the printing medium fed by the feed mechanism, and a printing unit configured to perform printing on the printing medium conveyed by the conveyance mechanism, the estimation method comprising measuring a cumulative rotation amount, the cumulative rotation amount being a cumulative value of a rotation amount of the roll sheet, measuring a cumulative conveyance amount, the cumulative conveyance amount being a cumulative value of a conveyance amount of the printing medium conveyed by the conveyance mechanism, and estimating a remaining amount of the roll sheet by using the following Equation (1): $R=PF/(\pi \cdot REV)$ . . . Equation (1), where the cumulative rotation amount that is measured is REV, the cumulative conveyance amount that is measured is PF, a diameter of the roll sheet is R, and $\pi$ is a ratio of a circumference of a circle to its diameter, resetting the measured cumulative rotation amount each time the remaining amount of the roll sheet is estimated or each time the remaining amount of the roll sheet is estimated multiple times, and resetting the measured cumulative conveyance amount each time the remaining amount of the roll sheet is estimated or each time the remaining amount of the roll sheet is estimated multiple times. In the estimation, the diameter of the roll sheet is calculated with the Equation (1), a filter process is performed on the diameter of the roll sheet calculated, and the diameter of the roll sheet subjected to the filter process is estimated as the remaining amount of the roll sheet.

DESCRIPTION OF EXEMPLARY EMBODIMENTS

An embodiment is described below with reference to the accompanying drawings.

Figure 1:
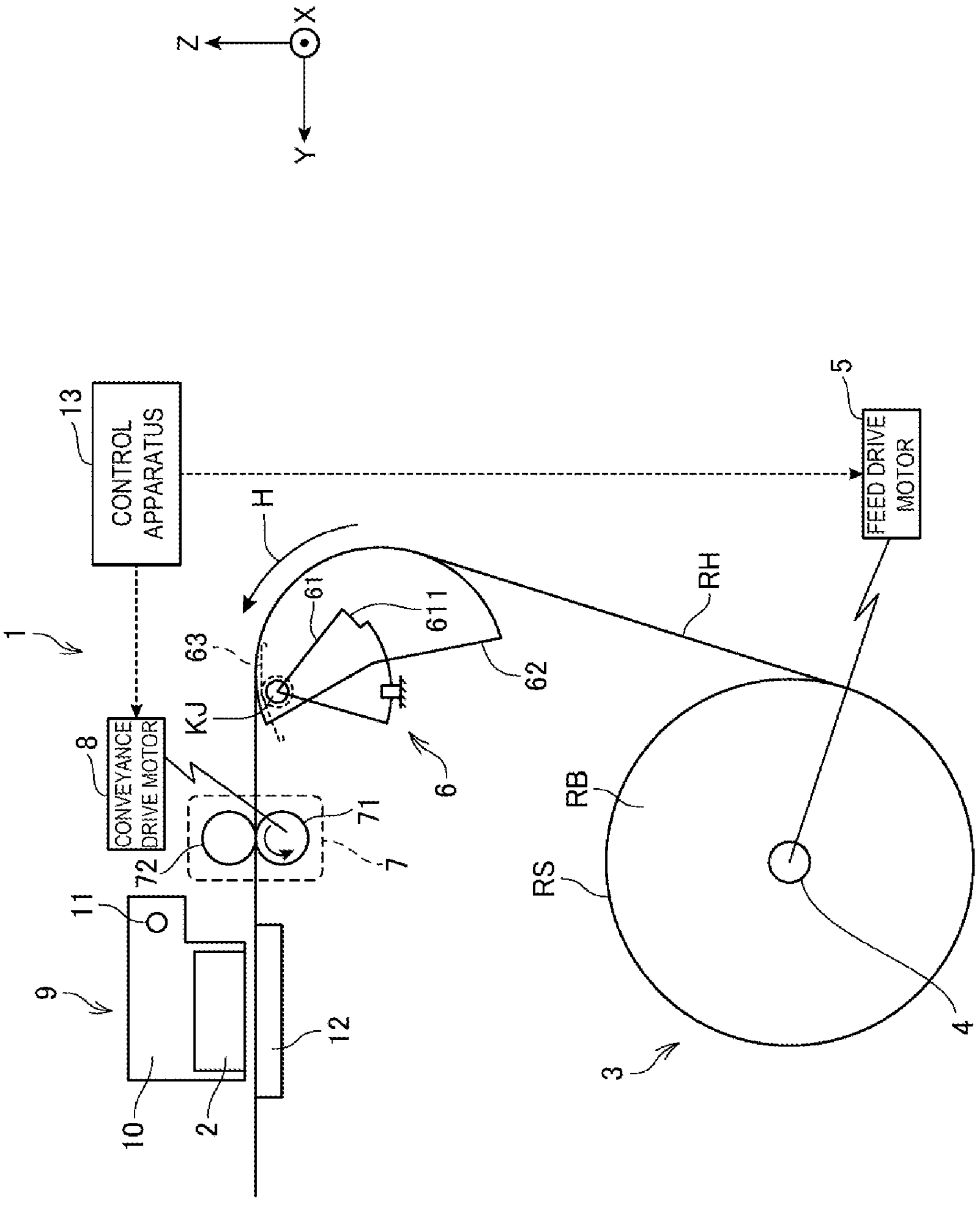
FIG. 1 is a diagram illustrating a configuration of a label printer.
Figure 2:
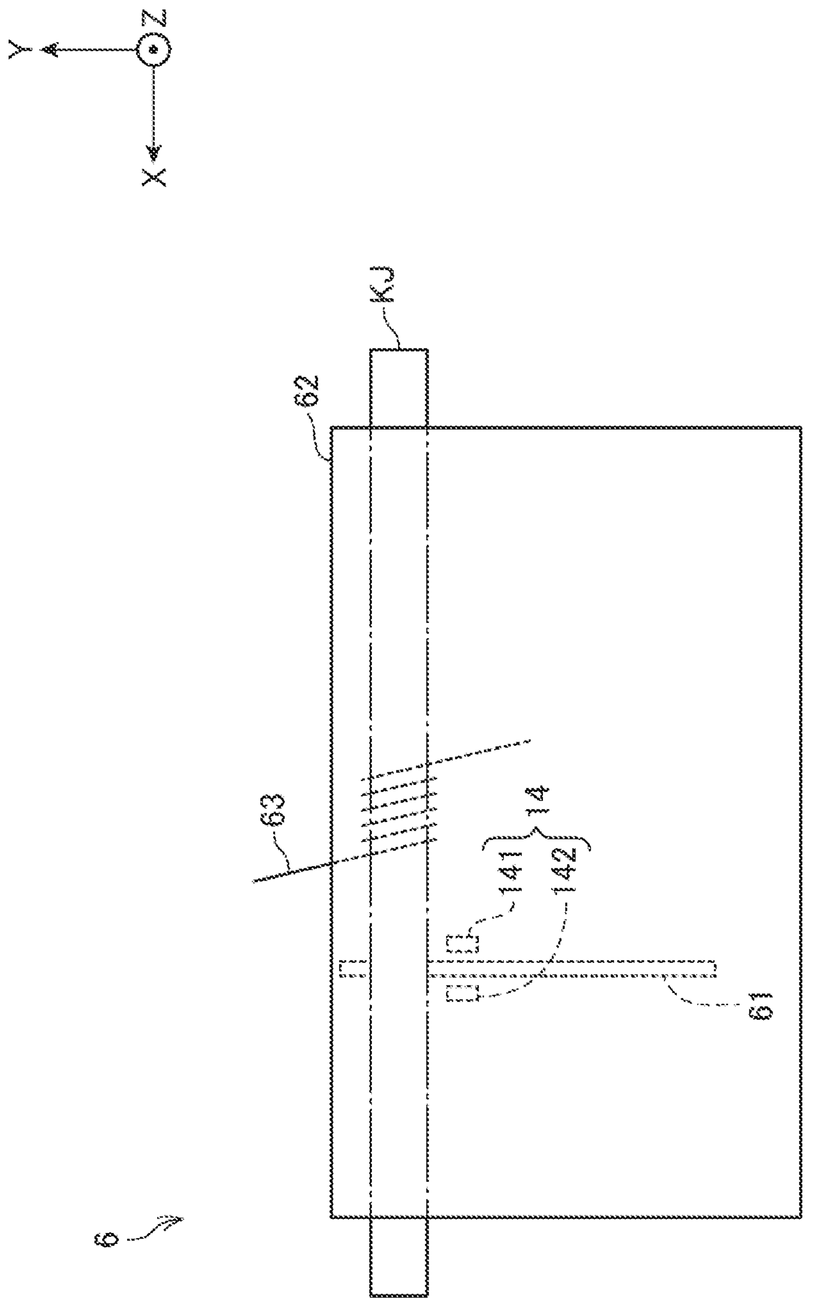
FIG. 2 is a diagram illustrating a feed control lever as viewed from above.
Figure 3:
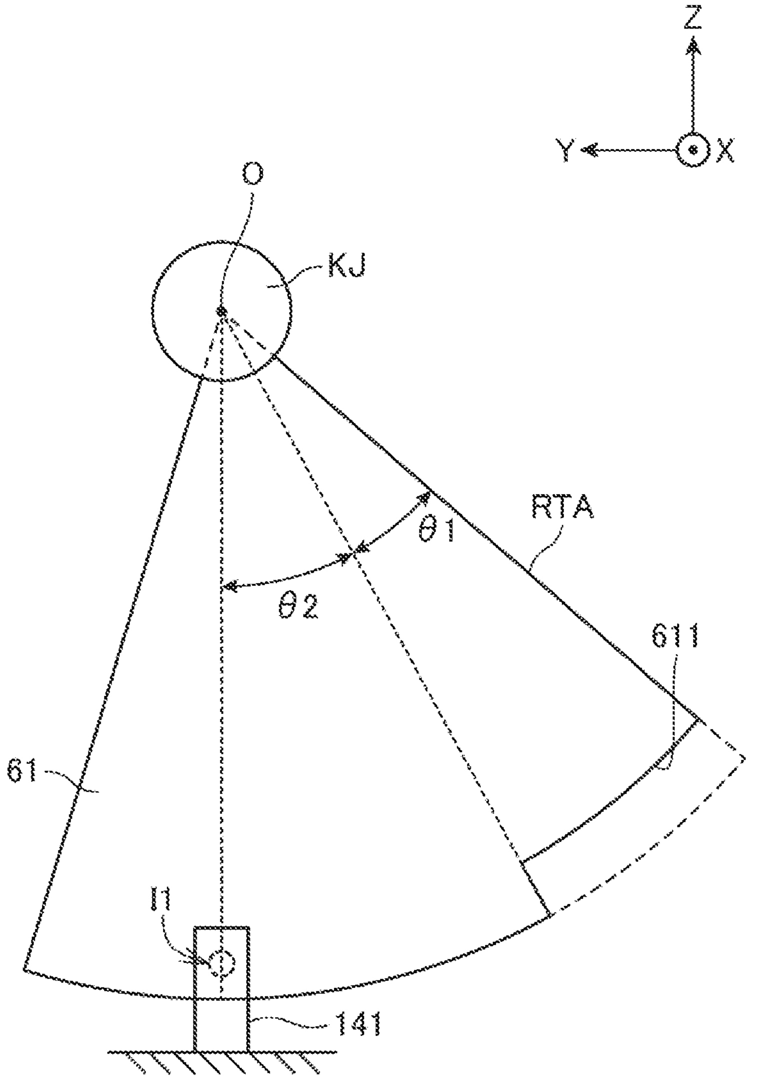
FIG. 3 is a diagram illustrating a feed control plate as viewed from the right side.

FIGS. 1, 2, and 3 illustrate the X axis, the Y axis, and the Z axis. The X axis, the Y axis, and the Z axis are orthogonal to each other. The Z axis indicates the vertical direction. The X axis and the Y axis are parallel to the horizontal direction. The X axis indicates the left-right direction. The Y axis indicates the front-rear direction. The positive direction of the X axis indicates the rightward direction. The positive direction of the Y axis indicates the forward direction. The positive direction of the Z axis indicates the upward direction.

FIG. 1 is a diagram illustrating a configuration of a label printer 1.

The label printer 1 is an example of "printing apparatus".

The label printer 1 is a serial ink-jet printer. The label printer 1 houses a roll sheet RS, conveys the housed roll sheet RS in a conveyance direction H, and performs printing on the roll sheet RS with a printing head 2, which is a serial ink-jet head.

The roll sheet RS is a rolled label sheet on which labels are pasted at a constant interval on a base sheet. The label printer 1 performs printing on the label of the roll sheet RS with the printing head 2.

The label printer 1 includes a roll sheet housing unit 3 that houses the roll sheet RS. In the following description, in the roll sheet RS, a rolled portion that is housed in the roll sheet housing unit 3 is referred to as "roll main body" with a reference symbol "RB". In addition, in the roll sheet RS, the label sheet fed and conveyed from roll main body RB is referred to as "conveyance roll sheet" with a reference symbol "RH".

The conveyance roll sheet RH is an example of "printing medium".

The roll sheet housing unit 3 includes a supporting member 4. The supporting member 4 supports the roll main body RB through a cylindrical core member provided at the center portion of the roll main body RB. The supporting member 4 is connected to the motor shaft of a feed drive motor 5 through a power transmission mechanism, and is rotated in accordance with the driving of the feed drive motor 5. In this manner, the roll main body RB rotates in conjunction with the rotation of the supporting member 4, and the conveyance roll sheet RH is fed from the roll main body RB. A conveyance path through which the conveyance roll sheet RH is conveyed is formed in the label printer 1. The conveyance roll sheet RH fed from the roll main body RB is conveyed in the conveyance direction H along the conveyance path.

The label printer 1 includes a feed control lever 6. The feed control lever 6 is provided downstream of the roll sheet housing unit 3 in the conveyance direction H. The feed control lever 6 moves in accordance with the change of the length of the conveyance roll sheet RH between the roll sheet housing unit 3 and a conveyance roller pair 7. More specifically, the feed control lever 6 rotates around a rotation shaft KJ extending in the left-right direction in accordance with the change of the length of the conveyance roll sheet RH between the roll sheet housing unit 3 and the conveyance roller pair 7.

In the following description, the clockwise direction and the counterclockwise direction are rotational directions based on the feed control lever 6 as viewed from the right side.

The label printer 1 includes the conveyance roller pair 7. The conveyance roller pair 7 is provided downstream of the feed control lever 6 in the conveyance direction H. The conveyance roller pair 7 includes a conveyance rotation roller 71, and a conveyance driven roller 72 that rotates to follow the rotation of the conveyance rotation roller 71. The conveyance driven roller 72 is provided at a position facing the conveyance rotation roller 71 in the conveyance path of the conveyance roll sheet RH. The conveyance rotation roller 71 is connected to a conveyance drive motor 8 through the power transmission mechanism not illustrated in the drawings, and is rotated in accordance with the driving of the conveyance drive motor 8. The conveyance roller pair 7 sandwiches the conveyance roll sheet RH with the conveyance rotation roller 71 and the conveyance driven roller 72, and conveys, in the conveyance direction H, the conveyance roll sheet RH fed from the roll sheet housing unit 3 through the rotation of the conveyance rotation roller 71.

The label printer 1 includes a printing unit 9. The printing unit 9 is provided downstream of the conveyance roller pair 7 in the conveyance direction H. The printing unit 9 includes a carriage 10, and the printing head 2 mounted in the carriage 10.

The printing unit 9 is an example of "printing unit".

The carriage 10 is supported by a carriage shaft 11 extending in an orthogonal direction orthogonal to the conveyance direction H, and causes the printing head 2 to perform a scan in the orthogonal direction along the carriage shaft 11.

The printing head 2 includes nozzle rows of four colors of CYMK, for example. The printing head 2 receives ink supplied from an ink reservoir part such as an ink cartridge and an ink tank not illustrated in the drawings, and forms dots on the conveyance roll sheet RH by ejecting the ink from the nozzle provided in each nozzle row. Note that the printing head 2 is not limited to a head that can perform color printing with the four colors of CMYK, and may be a head that can perform full-color printing using multi color ink including a special color ink in addition to the four colors of CMYK, or a head that can perform monochrome printing or two-color printing, for example.

A platen 12 is provided at a position facing the printing head 2 in the conveyance path of the conveyance roll sheet RH. The platen 12 is extended over a region where dots can be formed by the printing head 2, and flattens and supports the conveyance roll sheet RH in such a manner that the surface of the conveyance roll sheet RH located at the platen 12 is perpendicular to the discharging direction of the ink ejected from the printing head 2. Note that the platen 12 may be a so-called suctioning platen, which suctions the conveyance roll sheet RH by applying a suction force on the conveyance roll sheet RH.

The label printer 1 includes a control apparatus 13 that controls each unit of the label printer 1. Details of the control apparatus 13 are described later.

The feed control lever 6 is specifically described below.

FIG. 2 is a diagram illustrating the feed control lever 6 as viewed from above.

The feed control lever 6 includes a feed control plate 61 and a tension member 62.

The tension member 62 rotates around the rotation shaft KJ by following the change of the length of the conveyance roll sheet RH between the roll sheet housing unit 3 and the conveyance roller pair 7. The tension member 62 is biased by a biasing member 63 such as a spring, and applies a predetermined tensile force to the conveyance roll sheet RH between the roll sheet housing unit 3 and the conveyance roller pair 7. After being fed upward from the roll main body RB in the conveyance path of the conveyance roll sheet RH, the conveyance roll sheet RH is passed over the tension member 62 and bent forward.

FIG. 3 is a diagram illustrating the feed control plate 61 as viewed from the right side.

The feed control plate 61 is a member with a circular sector shape. The feed control plate 61 of the embodiment is composed of a light-shielding material. A cutout 611 is formed in the outer peripheral edge of the feed control plate 61. The cutout 611 is formed to extend in the circumferential direction from a rear edge RTA corresponding to the radius of the circular sector. The length of the cutout 611 in the circumferential direction is a length corresponding to an angle θ1. The angle θ1 is an angle from the rear edge RTA with a rotation center O of the rotation shaft KJ as the vertex.

The feed control plate 61 is provided such that in the vertical direction, the center of the circular sector is located at the rotation center O of the rotation shaft KJ. The feed control plate 61 rotates around the rotation shaft KJ in synchronization with the rotation of the tension member 62.

The label printer 1 includes a detector 14. The detector 14 is an optical sensor, and includes an irradiation unit 141 that emits light and a light reception unit 142 that receives light. The irradiation unit 141 is composed of a light emitting diode (LED), a laser light-emitting element or the like, for example. The light reception unit 142 is composed of a phototransistor, a photo IC or the like. The feed control plate 61 is provided between the irradiation unit 141 and the light reception unit 142 in the left-right direction. The irradiation unit 141 emits light toward the feed control plate 61. The irradiation unit 141 of the embodiment emits light rightward. The light reception unit 142 is provided at a position facing the irradiation unit 141 with the light reception surface facing the feed control plate 61.

When the portion irradiated by the irradiation unit 141 with light is a portion other than the cutout 611, the light emitted by the irradiation unit 141 is blocked by the feed control plate 61. In this case, the light reception unit 142 does not receive the light emitted by the irradiation unit 141, and the detector 14 outputs a detection value of a Low-level.

On the other hand, when the portion irradiated by the irradiation unit 141 with light is the cutout 611, the cutout 611 transmits the light emitted by the irradiation unit 141. Therefore, the irradiation unit 141 receives the light emitted by the light reception unit 142, and the detector 14 outputs a detection value of a High-level.

When the feed control lever 6 is located at the home position, the irradiation unit 141 irradiates a position Il with light. The home position of the feed control lever 6 is the position of the feed control lever 6 when the feed control lever 6 is rotated counterclockwise the most in the possible rotation range of the feed control lever 6, and the home position is defined by biasing of the biasing member 63. The feed control lever 6 does not rotate counterclockwise from the home position. When the feed control lever 6 rotates clockwise from the home position by an angle θ2 or greater, the irradiation unit 141 irradiates the cutout 611 with light.

Figure 4:
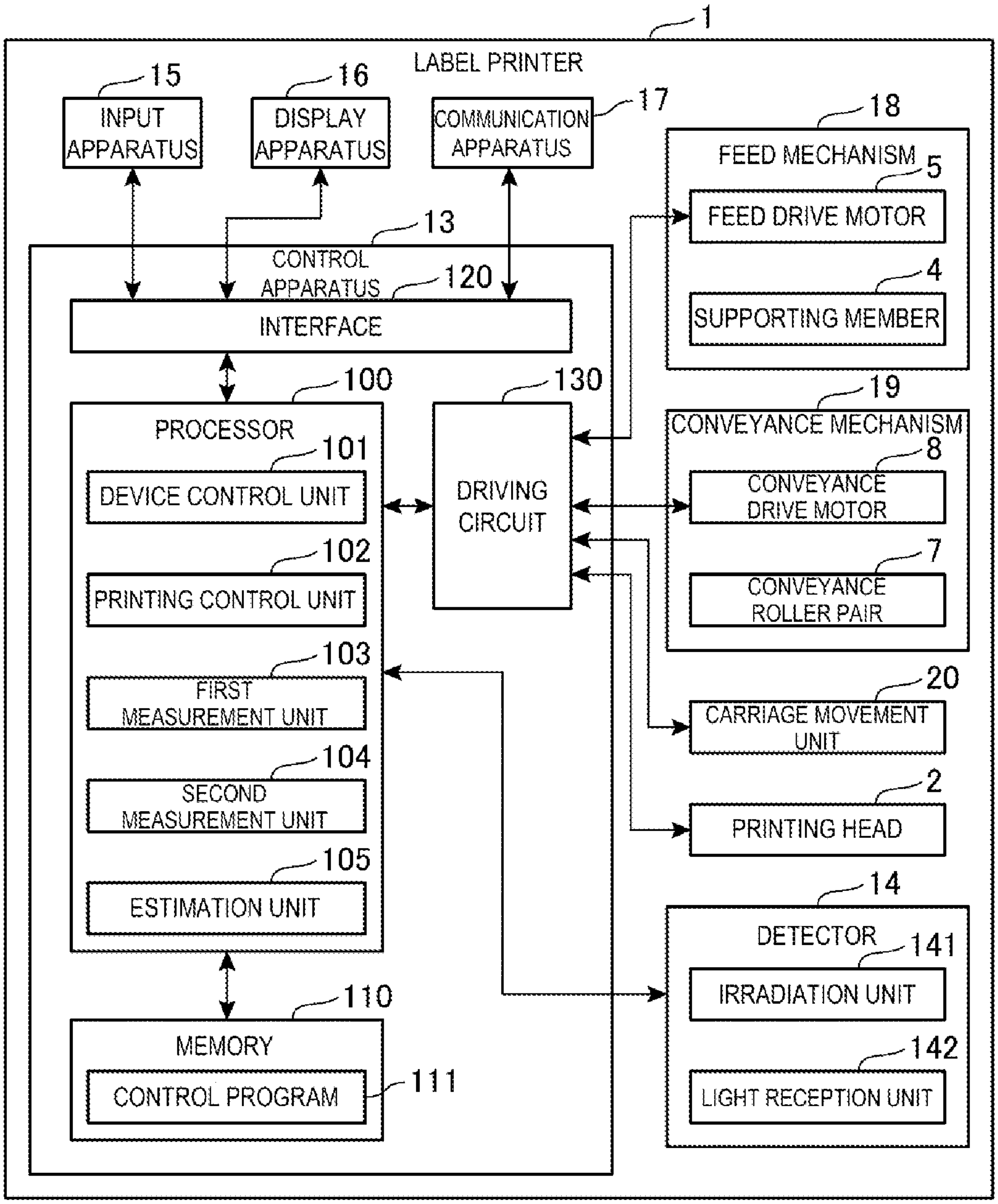
FIG. 4 is a block diagram illustrating a configuration of a control system of the label printer.

FIG. 4 is a block diagram illustrating a configuration of a control system of the label printer 1.

The label printer 1 includes an input apparatus 15, a display apparatus 16, and a communication apparatus 17. The input apparatus 15, the display apparatus 16, and the communication apparatus 17 are connected to the control apparatus 13. The input apparatus 15 is an apparatus for the user of the label printer 1 to input a printing condition and the like, and is an input apparatus such as a keyboard and a mouse, for example. The input apparatus 15 may be a desktop or laptop personal computer, a tablet terminal, a mobile terminal or the like, and may be provided separately from the label printer 1. The input apparatus 15 outputs information input by the operator, to the control apparatus 13. The display apparatus 16 includes a display screen of a liquid crystal display panel or the like, and displays various information under the control of the control apparatus 13. The communication apparatus 17 includes communication hardware such as a communication circuit according to a predetermined communication standard, and communicates with an apparatus provided separately from the label printer 1 in accordance with the predetermined communication standard.

The control apparatus 13 includes a processor 100 such as central processing unit (CPU) and micro processing unit (MPU), a memory 110, an interface 120, and a driving circuit 130.

The processor 100 controls each unit of the control apparatus 13 by reading and executing a control program 111 stored in the memory 110. The processor 100 includes a device control unit 101, a printing control unit 102, a first measurement unit 103, a second measurement unit 104, and an estimation unit 105 as functional units. The processor 100 functions as the device control unit 101, the printing control unit 102, the first measurement unit 103, the second measurement unit 104, and the estimation unit 105 by executing the control program 111 stored in the memory 110.

The device control unit 101 corresponds to an example of "notification unit".

The memory 110 stores the control program 111 to be executed by the processor 100, setting data related to setting of the label printer 1, and other various data. The memory 110 includes a nonvolatile storage region. In addition, the memory 110 may include a volatile storage region, and constitute a work area of the processor 100.

The interface 120 includes communication hardware such as a connector and an interface circuit. The interface 120 is connected to the input apparatus 15, the display apparatus 16 and the communication apparatus 17, and conducts data communication with the apparatuses.

The label printer 1 includes a feed mechanism 18, a conveyance mechanism 19, a carriage movement unit 20, the printing head 2, and the detector 14.

The feed mechanism 18 includes the feed drive motor 5 and the supporting member 4. The feed drive motor 5 is connected to the control apparatus 13 and controlled by the control apparatus 13. The control apparatus 13 rotates the supporting member 4 by driving the feed drive motor 5.

The conveyance mechanism 19 includes the conveyance drive motor 8 and the conveyance roller pair 7. The conveyance drive motor 8 is connected to the control apparatus 13 and controlled by the control apparatus 13. The control apparatus 13 rotates the conveyance rotation roller 71 by driving the conveyance drive motor 8, and causes the conveyance roller pair 7 to convey the conveyance roll sheet RH.

The carriage movement unit 20 includes the carriage 10, a motor that causes the carriage 10 to perform a scan, the power transmission mechanism that transmits the power of the motor to the carriage 10, and the like. The control apparatus 13 moves the carriage 10 in the left-right direction by driving the motor provided in the carriage movement unit 20.

The printing head 2 is connected to the control apparatus 13. The control apparatus 13 drives the printing head 2 to eject ink toward the conveyance roll sheet RH. By controlling the carriage movement unit 20 and the printing head 2, the control apparatus 13 moves the carriage 10 while ejecting ink from the printing head 2, and conveys the conveyance roll sheet RH in the conveyance direction H.

The detector 14 is connected to the control apparatus 13. The control apparatus 13 acquires a detection value of the detector 14, and reflects it to the control of the feed mechanism 18.

As described above, the processor 100 functions as the device control unit 101, the printing control unit 102, the first measurement unit 103, the second measurement unit 104, and the estimation unit 105.

The device control unit 101 receives an operation of the operator through the input apparatus 15, causes the display apparatus 16 to display various information, and communicates with an apparatus provided separately from the label printer 1 through the communication apparatus 17. The device control unit 101 notifies the user of the label printer 1 of the remaining amount of the roll sheet RS estimated by the estimation unit 105 described later. The device control unit 101 may provide the notification of the remaining amount of the roll sheet RS estimated by the estimation unit 105 by displaying information representing the remaining amount of the roll sheet RS on the display apparatus 16. In addition, the device control unit 101 may provide the notification of the remaining amount of the roll sheet RS estimated by the estimation unit 105 by transmitting the information representing the remaining amount of the roll sheet RS to the terminal apparatus used by the user of the label printer 1 through the communication apparatus 17. The device control unit 101 provides the notification of the remaining amount of the roll sheet RS when a trigger for performing the notification occurs. Examples of the trigger include the fact that the remaining amount of the roll sheet RS is estimated by the estimation unit 105, the fact that the printing is completed, the fact that a preliminarily set time for performing the notification is reached, and the fact that an instruction to provide the notification of the remaining amount of the roll sheet RS is input from the user to the input apparatus 15.

The printing control unit 102 performs printing on the conveyance roll sheet RH by controlling the feed mechanism 18, the conveyance mechanism 19, the carriage movement unit 20, and the printing head 2.

The printing control unit 102 drives the conveyance drive motor 8 in accordance with conveyance drive data. The conveyance drive data is data related to the driving of the conveyance drive motor 8, and, in the conveyance drive data, the driving time for driving the conveyance drive motor 8, the stop time for stopping the conveyance drive motor 8 and the like are described. The conveyance drive data is stored in the memory 110. The printing control unit 102 of the embodiment drives the conveyance drive motor 8 in a control mode of repeating the drive and stop in a predetermined cycle in accordance with the conveyance drive data.

The printing control unit 102 controls the driving of the feed mechanism 18 on the basis of the detection value of the detector 14. When the detector 14 outputs a Low-level detection value, the printing control unit 102 stops the driving of the feed drive motor 5, and stops the feeding of the conveyance roll sheet RH from the roll main body RB. When the detector 14 outputs a High-level detection value, the printing control unit 102 feeds the conveyance roll sheet RH from the roll main body RB by driving the feed drive motor 5.

The printing control unit 102 outputs the information about the rotational frequency and drive time of the feed drive motor 5 to the first measurement unit 103. In addition, the printing control unit 102 outputs the information about the rotational frequency and drive time of the conveyance drive motor 8 to the second measurement unit 104.

The first measurement unit 103 measures a cumulative rotation amount, which is a cumulative value of the rotation amount of the roll sheet RS. The first measurement unit 103 measures the cumulative rotation amount on the basis of the rotation amount of the feed drive motor 5. The first measurement unit 103 acquires information about the rotational frequency and drive time of the feed drive motor 5 from the printing control unit 102. Then, the first measurement unit 103 measures the cumulative rotation amount by calculating the rotation amount of the roll sheet RS from the acquired information, and counting the calculated rotation amount of the roll sheet RS in a cumulative manner. The first measurement unit 103 outputs the measured cumulative rotation amount to the estimation unit 105. When first reset information is output from the estimation unit 105, the first measurement unit 103 resets the measured cumulative rotation amount. Specifically, the first measurement unit 103 resets the value of the measured cumulative rotation amount to zero. After the reset, the first measurement unit 103 measures the cumulative rotation amount again from the value of zero. The cumulative rotation amount may be reset each time cumulative rotation amount is measured, or each time the cumulative rotation amount is measured multiple times.

The second measurement unit 104 measures a cumulative conveyance amount, which is a cumulative value of the conveyance amount of the conveyance roll sheet RH. The second measurement unit 104 measures the cumulative conveyance amount on the basis of the rotation amount of the conveyance drive motor 8. The second measurement unit 104 acquires information about the rotational frequency and drive time of the conveyance drive motor 8 from the printing control unit 102. Then, the second measurement unit 104 measures the cumulative conveyance amount by calculating the conveyance amount of the conveyance roll sheet RH from the acquired information, and counting the calculated conveyance amount of the conveyance roll sheet RH in a cumulative manner. When second reset information is output from the estimation unit 105, the second measurement unit 104 resets the measured cumulative conveyance amount. Specifically, the second measurement unit 104 resets the value of the measured cumulative conveyance amount to zero. After the reset, the second measurement unit 104 measures the cumulative conveyance amount again from the value of zero. The cumulative conveyance amount may be reset each time the cumulative conveyance amount is measured, or each time the cumulative conveyance amount is measured multiple times.

The estimation unit 105 estimates the remaining amount of the roll sheet RS.

In the estimation of the remaining amount of the roll sheet RS, the estimation unit 105 calculates the diameter of the roll sheet RS by using the following Equation (1).

$$R=PF/(\pi\cdot REV) \quad \text{Equation (1)}$$

In Equation (1), R is the diameter of the roll sheet RS. In Equation (1), PF is the cumulative conveyance amount measured by the second measurement unit 104. In Equation (1), π is the ratio of the circumference of a circle to its diameter. In Equation (1), REV is the cumulative rotation amount measured by the first measurement unit 103.

In the estimation of the remaining amount of the roll sheet RS, the estimation unit 105 performs a filter process on the diameter of the roll sheet RS calculated with Equation (1), and sets the diameter of the roll sheet RS after the filter process as the remaining amount of the roll sheet RS. The estimation unit 105 performs a filter process such as a moving average filter process and a Kalman filter process, for example, on the diameter of the roll sheet RS calculated with Equation (1). The moving average filter process is a filter process with a moving average filter. The Kalman filter process is a filter process with a Kalman filter.

When performing the moving average filter process, the estimation unit 105 acquires the value to be subjected to the moving average filter process from the memory 110, and determines the moving average value by using the acquired value to be subjected to the process and the diameter of the roll sheet RS calculated this time with Equation (1). Note that when the estimation unit 105 performs the moving average filter process, N values to be subjected to the moving average filter process are recorded in the memory 110. Here, N is an integer of 1 or more. The N values recorded in the memory 110 are values representing the remaining amount of the roll sheet RS previously estimated by the estimation unit 105, and are values representing the diameter of the roll sheet RS after the filter process. The N values recorded in the memory 110 are updated each time the estimation unit 105 estimates the remaining amount of the roll sheet RS. Specifically, the N values recorded in the memory 110 are updated such that the value of the remaining amount of the roll sheet RS estimated by the estimation unit 105 this time is included and that the oldest previously estimated remaining amount of the roll sheet RS is not included.

When performing the Kalman filter process, the estimation unit 105 acquires a value representing the remaining amount of the roll sheet RS estimated last time from the memory 110. Then, the estimation unit 105 performs the Kalman filter process by using the value acquired from the memory 110 and the diameter of the roll sheet RS calculated this time with Equation (1). Note that when the estimation unit 105 performs the Kalman filter process, a value representing the remaining amount of the roll sheet RS estimated last time by the estimation unit 105 is recorded in the memory 110. This value is updated to a value representing the remaining amount of the roll sheet RS estimated this time by the estimation unit 105 each time the estimation unit 105 estimates the remaining amount of the roll sheet RS.

After estimating the remaining amount of the roll sheet RS, the estimation unit 105 outputs first reset information to the first measurement unit 103. The first reset information is information for an instruction of a reset of the cumulative rotation amount measured by the first measurement unit 103.

In addition, after estimating the remaining amount of the roll sheet RS, the estimation unit 105 outputs second reset information to the second measurement unit 104. The second reset information is information for an instruction of a reset of the cumulative conveyance amount measured by the second measurement unit 104.

Next, an operation of the label printer 1 is described.

Figure 5:
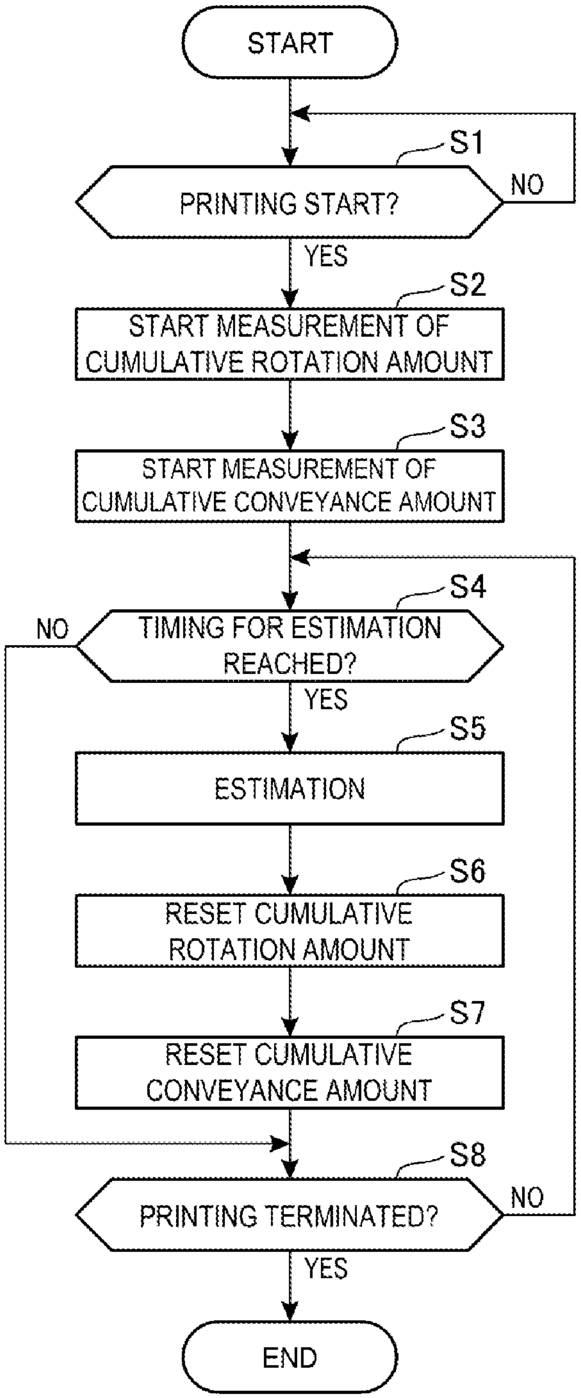
FIG. 5 is a flowchart illustrating an operation of the label printer.

FIG. 5 is a flowchart illustrating an operation of the label printer 1.

The printing control unit 102 of the label printer 1 determines whether to start the printing (step S1).

For example, at step S1, when printing data is received from an external apparatus, the printing control unit 102 determines that the printing will be started. In addition, for example, when the device control unit 101 receives a printing start operation from the user through the input apparatus 15, the printing control unit 102 determines that the printing will be started at step S1.

When the printing control unit 102 determines that the printing will not be started (step S1: NO), the printing control unit 102 performs the determination of step S1 again.

When the printing control unit 102 determines that the printing will be started (step S1: YES), the first measurement unit 103 starts the measurement of the cumulative rotation amount (step S2).

Next, the second measurement unit 104 starts the measurement of the cumulative conveyance amount (step S3).

Note that the processing order of steps S2 and S3 may be reversed. In addition, steps S2 and S3 may be simultaneously performed.

Next, the estimation unit 105 determines whether the timing for estimating the remaining amount of the roll sheet RS has reached (step S4).

Examples of the timing for estimating the remaining amount of the roll sheet RS include a timing when the cumulative rotation amount measured by the first measurement unit 103 has a predetermined threshold value or greater.

In addition, examples of the timing for estimating the remaining amount of the roll sheet RS include a timing when the cumulative conveyance amount measured by the second measurement unit 104 has a predetermined threshold value or greater.

When the estimation unit 105 determines that the timing for estimating the remaining amount of the roll sheet RS has not reached (step S4: NO), the processor 100 performs the determination of step S8.

On the other hand, when the estimation unit 105 determines that the timing for estimating the remaining amount of the roll sheet RS has reached (step S4: YES), it estimates the remaining amount of the roll sheet RS (step S5).

Next, the first measurement unit 103 resets the measured cumulative rotation amount (step S6).

Next, the second measurement unit 104 resets the measured cumulative conveyance amount (step S7). Note that the processing order of steps S6 and S7 may be reversed. In addition, steps S6 and S7 may be simultaneously performed.

Next, the printing control unit 102 determines whether to terminate the printing (step S8).

For example, when there is unprocessed data in the data included in the printing data, the printing control unit 102 makes a negative determination at step S8.

When the printing control unit 102 determines that the printing will not be terminated (step S8: NO), the printing control unit 102 performs the processes subsequent to step S4 again.

On the other hand, when the printing control unit 102 determines that the printing will be terminated (step S8: YES), the printing control unit 102 terminates this process.

Next, the estimation accuracy of the estimation unit 105 is described.

Figure 6:
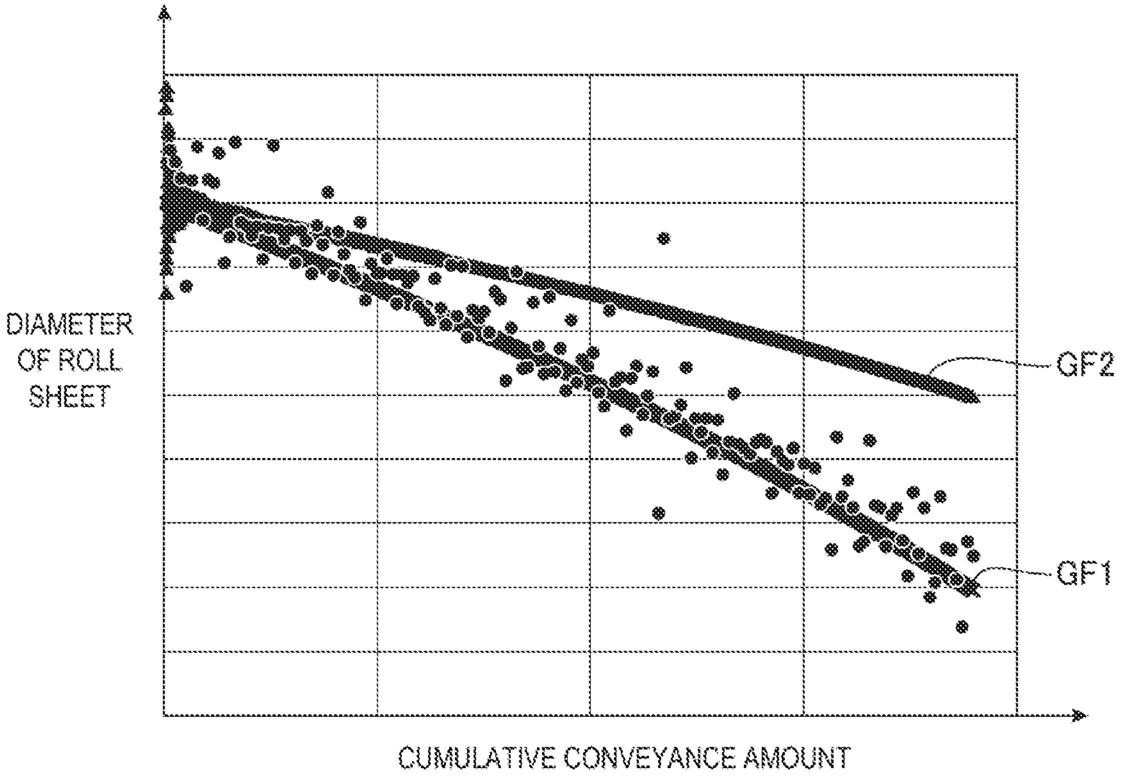
FIG. 6 is a chart illustrating a relationship between a diameter of a roll sheet and a cumulative conveyance amount.

FIG. 6 is a chart illustrating a relationship between the cumulative conveyance amount and the diameter of the roll sheet RS. FIG. 6 illustrates a simulation result.

In the chart of FIG. 6, the ordinate is set to the diameter of the roll sheet RS, and the abscissa is set to cumulative conveyance amount.

The graph GF1 of FIG. 6 illustrates a relationship between a true diameter of the roll sheet RS and a cumulative conveyance amount.

The graph GF2 of FIG. 6 illustrates a relationship between the cumulative conveyance amount and the diameter of the roll sheet RS determined by a known method. The known method is a method of calculating the diameter of the roll sheet RS with Equation (1) without resetting the cumulative rotation amount measured by the first measurement unit 103 and the cumulative conveyance amount measured by the second measurement unit 104. As is clear from the comparison between the graph GF1 and the graph GF2, the diameter of the roll sheet RS determined by the known method has more errors with respect to the true diameter of the roll sheet RS as the cumulative conveyance amount increases.

The reason for this is as follows.

Equation (1) indicates that PF is in proportion to REV with $\pi R$ as a coefficient. However, since the diameter of the roll sheet RS decreases as the cumulative conveyance amount increases, the rotation amount of the roll sheet RS with respect to the conveyance amount of the roll sheet RS per unit increases as the diameter of the roll sheet RS decreases. Specifically, in the known method, the diameter of the roll sheet RS is determined by substituting the cumulative conveyance amount and the cumulative rotation amount that are not actually proportional into Equation (1), which assumes a proportional relationship, without taking into account the variation of the diameter of the roll sheet RS. Consequently, in the known method, the error with respect to the true diameter of the roll sheet RS undesirably increases as the cumulative conveyance amount increases.

In FIG. 6, the plot of the black circle represents the diameter of the roll sheet RS calculated by the estimation unit 105 with Equation (1) in a configuration in which the cumulative conveyance amount and the cumulative rotation amount are reset each time the estimation unit 105 makes an estimation. The plot of FIG. 6 changes along the graph GF1 in accordance with the change of the cumulative conveyance amount even with errors with respect to the graph GF1.

The reason for this is as follows.

By resetting the cumulative rotation amount and the cumulative conveyance amount, the relationship between the cumulative rotation amount and the cumulative conveyance amount at the time of reset can be again set to the relationship corresponding to the diameter of the roll sheet RS at the time of reset. Thus, by resetting the cumulative conveyance amount and the cumulative rotation amount, the estimation unit 105 can take into account the change of the diameter of the roll sheet RS for the calculation of the diameter of the roll sheet RS. In this manner, the plot of FIG. 6 changes along the graph GF1.

Note that the plot of FIG. 6 has an error with respect to the graph GF1 because the feed mechanism 18 and the conveyance mechanism 19 are asynchronously driven.

Figure 7:
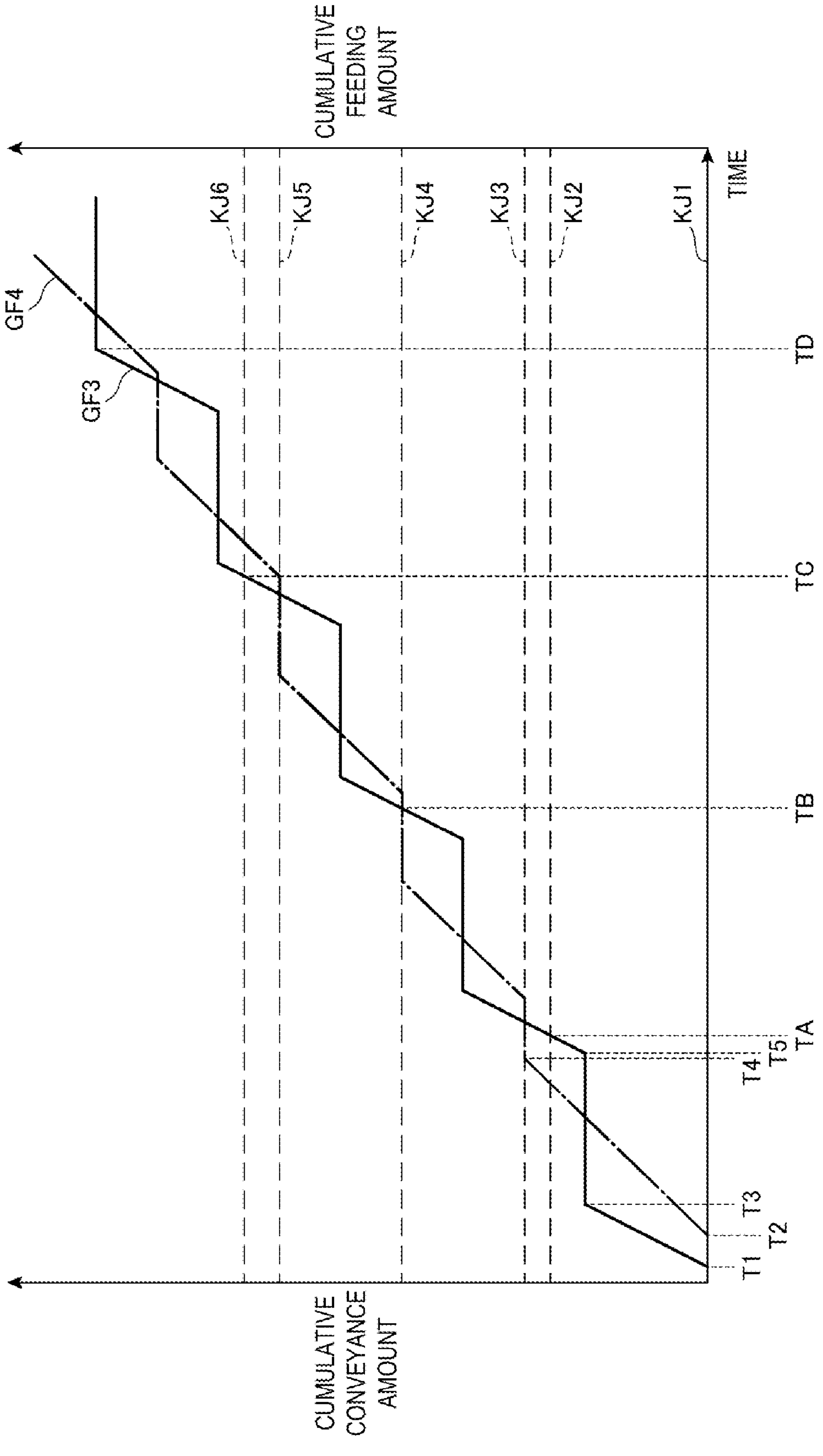
FIG. 7 is a chart for describing driving of a feed mechanism and a conveyance mechanism.

FIG. 7 is a chart for describing the driving of the feed mechanism 18 and the conveyance mechanism 19.

In FIG. 7, the first ordinate is set to the cumulative conveyance amount. In FIG. 7, the second ordinate is set to the cumulative feeding amount. The cumulative feeding amount is a cumulative value of the feeding amount of the conveyance roll sheet RH from the roll sheet RS. The first ordinate and the second ordinate are the same scale. In FIG. 7, the abscissa is set to the time.

The graph GF3 of FIG. 7 illustrates a time variation of the cumulative conveyance amount. In addition, the graph GF4 of FIG. 7 illustrates a time variation of the cumulative feeding amount.

When the label printer 1 starts the printing at the timing T1, the conveyance mechanism 19 is driven, and the cumulative conveyance amount increases after the timing T1. Between the timings T1 and T2, the driving of the feed mechanism 18 is stopped. Therefore, between the timings T1 and T2, the conveyance roll sheet RH between the roll sheet housing unit 3 and the conveyance roller pair 7 is short. As a result, between the timings T1 and T2, the feed control lever 6 rotates clockwise with the passage of time.

When the rotation angle of the feed control lever 6 from the home position becomes the angle θ2 or greater at the timing T2, the detection value of the detector 14 changes from the Low-level to the High-level. When the detection value of the detector 14 changes to the High-level, the feed mechanism 18 is driven and the cumulative feeding amount increases after the timing T2. Note that when the feeding amount of the feed mechanism 18 per unit time is smaller than the conveyance amount of the conveyance mechanism 19 per unit time, the conveyance roll sheet RH between the roll sheet housing unit 3 and the conveyance roller pair 7 is short. In addition, when the feeding amount of the feed mechanism 18 per unit time is greater than the conveyance amount of the conveyance mechanism 19 per unit time, the conveyance roll sheet RH between the roll sheet housing unit 3 and the conveyance roller pair 7 is long. Therefore, the feed control lever 6 rotates clockwise when the feeding amount of the feed mechanism 18 per unit time is smaller than the conveyance amount of the conveyance mechanism 19 per unit time, whereas the feed control lever 6 rotates counterclockwise when the feeding amount of the feed mechanism 18 per unit time is greater than the conveyance amount of the conveyance mechanism 19 per unit time.

When the driving of the conveyance mechanism 19 is stopped at the timing T3, the increase of the cumulative conveyance amount is stopped after the timing T3.

When the rotation angle of the feed control lever 6 from the home position becomes smaller than the angle θ2 between the timings T3 and T4, the detection value of the detector 14 changes from the High-level to the Low-level. When the detection value of the detector 14 changes to the Low-level, the driving of the feed mechanism 18 is stopped, and the increase of the cumulative feeding amount stops after the timing T4.

When the driving of the conveyance mechanism 19 is started again at the timing T5, the cumulative conveyance amount increases again after the timing T5.

In this manner, in the label printer 1, the conveyance mechanism 19 drives and stops in a predetermined cycle, and the feed mechanism 18 drives and stops in accordance with the change of the level of the detection value of the detector 14. In this manner, in the label printer 1, the conveyance mechanism 19 and the feed mechanism 18 asynchronously drive.

At the timing TA of FIG. 7, it is assumed that the timing for the estimation unit 105 to estimate the remaining amount of the roll sheet RS has reached. At the timing TA, the cumulative conveyance amount from a reference KJ1 is smaller than the cumulative feeding amount from the reference KJ1. In this case, the diameter of the roll sheet RS calculated from Equation (1) at the timing TA is calculated as a value smaller than the true diameter of the roll sheet RS.

It is assumed that the timing for the estimation unit 105 to estimate the remaining amount of the roll sheet RS has reached at the timing TB of FIG. 7. At the timing TB, the cumulative conveyance amount from a reference KJ2 is greater than the cumulative feeding amount from a reference KJ3. In this case, the diameter of the roll sheet RS calculated from Equation (1) at the timing TB is calculated as a value greater than the true diameter of the roll sheet RS. Note that the cumulative conveyance amount from the reference KJ2 is a cumulative conveyance amount of a case where the cumulative conveyance amount at the timing TA is set as zero. In addition, the cumulative feeding amount from the reference KJ3 is a cumulative feeding amount of a case where the cumulative feeding amount at the timing TA is set to zero.

It is assumed that the timing for the estimation unit 105 to estimate the remaining amount of the roll sheet RS has reached at the timing TC of FIG. 7. At the timing TC, the cumulative conveyance amount from a reference KJ4 is greater than the cumulative feeding amount from the reference KJ4. In this case, the diameter of the roll sheet RS calculated from Equation (1) at the timing TC is calculated as a value greater than the true diameter of the roll sheet RS. Note that the cumulative conveyance amount and the cumulative feeding amount from the reference KJ4 are a cumulative conveyance amount and a cumulative feeding amount of a case where the cumulative conveyance amount and the cumulative feeding amount at the timing TB are set to zero.

It is assumed that the timing for the estimation unit 105 to estimate the remaining amount of the roll sheet RS has reached at the timing TD of FIG. 7. At the timing TD, the cumulative conveyance amount from a reference KJ6 is greater than the cumulative feeding amount from a reference KJ5. In this case, the diameter of the roll sheet RS calculated from Equation (1) at the timing TD is calculated as a value greater than the true diameter of the roll sheet RS. Note that the cumulative conveyance amount from the reference KJ6 is a cumulative conveyance amount of a case where the cumulative conveyance amount at the timing TC is set as zero. In addition, the cumulative feeding amount from the reference KJ5 is a cumulative feeding amount of a case where the cumulative feeding amount at the timing TC is set to zero.

As described above, since the feed mechanism 18 and the conveyance mechanism 19 asynchronously drive, the cumulative feeding amount may be greater than the cumulative conveyance amount or the cumulative feeding amount may be smaller than the cumulative conveyance amount depending on the timing of the estimation of the estimation unit 105. The cumulative feeding amount is an amount defined by the diameter of the roll sheet RS and the cumulative rotation amount of the roll sheet RS. As such, when the cumulative feeding amount is large with respect to the cumulative conveyance amount, the relationship between the cumulative conveyance amount and the cumulative rotation amount to be substituted into Equation (1) may not have a constant relationship. As a result, the diameter of the roll sheet RS calculated from Equation (1) may have an error with respect to the true diameter of the roll sheet RS. As a result, the plot of FIG. 6 has an error with respect to the true diameter of the roll sheet RS. In view of this, the estimation unit 105 performs the filter process in order to suppress the error with respect to the true diameter of the roll sheet RS.

Figure 8:
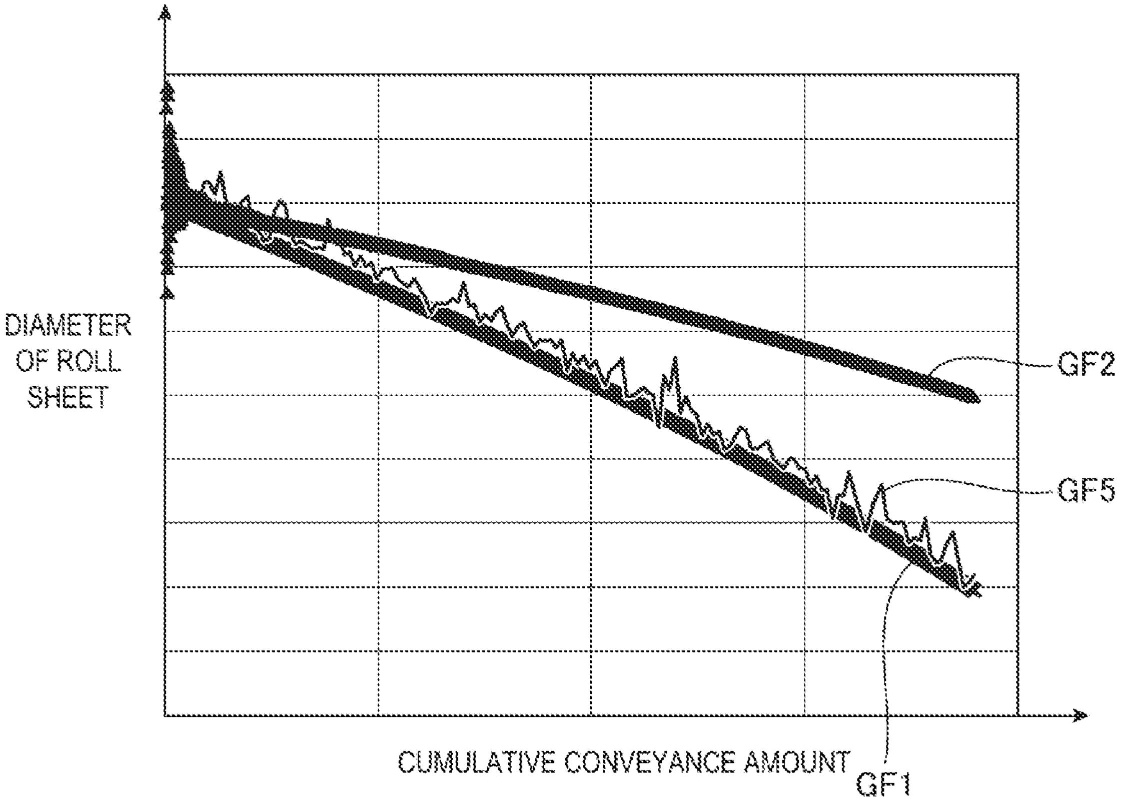
FIG. 8 is a chart illustrating a relationship between a diameter of a roll sheet and a cumulative conveyance amount.

FIG. 8 is a chart illustrating a relationship between the cumulative conveyance amount and the diameter of the roll sheet RS. FIG. 8 illustrates a simulation result.

In FIG. 8, the ordinate is set to the diameter of the roll sheet RS, and the abscissa is set to the cumulative conveyance amount.

The graph GF1 of FIG. 8 is the same as the graph GF1 of FIG. 6. The graph GF2 of FIG. 8 is the same as the graph GF2 of FIG. 6.

The graph GF5 of FIG. 8 is a graph obtained by performing a moving average filter process on the plot of FIG. 6. As is clear from the comparison between the graph GF5 of FIG. 8 and the plot of FIG. 6, the graph GF5 of FIG. 8 has fewer errors with respect to the graph GF1 than the plot of FIG. 6.

As described above with reference to FIGS. 6 and 8, through the reset of the first measurement unit 103 and the second measurement unit 104 and the filter process of the estimation unit 105, the estimation unit 105 can accurately estimate the remaining amount of the roll sheet RS.

As described above, the label printer 1 includes the feed mechanism 18 that feeds the conveyance roll sheet RH from the roll sheet RS by rotating the roll sheet RS, the conveyance mechanism 19 that conveys the conveyance roll sheet RH fed by the feed mechanism 18, the printing unit 9 that performs printing on the conveyance roll sheet RH conveyed by the conveyance mechanism 19, the first measurement unit 103 that measures the cumulative rotation amount of the roll sheet RS, the second measurement unit 104 that measures the cumulative conveyance amount of the conveyance roll sheet RH conveyed by the conveyance mechanism 19, and the estimation unit 105 that estimates the remaining amount of the roll sheet RS by using Equation (1) in which the cumulative rotation amount measured by the first measurement unit 103 is REV, the cumulative conveyance amount measured by the second measurement unit 104 is PF, and the diameter of the roll sheet RS is R. The first measurement unit 103 resets the measured cumulative rotation amount each time the estimation unit 105 estimates the remaining amount of the roll sheet RS or each time the estimation unit 105 estimates the remaining amount of the roll sheet RS multiple times. The second measurement unit 104 resets the measured cumulative conveyance amount each time the estimation unit 105 estimates the remaining amount of the roll sheet RS or each time the estimation unit 105 estimates the remaining amount of the roll sheet RS multiple times. The estimation unit 105 estimates the remaining amount of the roll sheet RS by calculating the diameter of the roll sheet RS with Equation (1) and performing the filter process on the calculated diameter of the roll sheet RS.

In this manner, the remaining amount of the roll sheet RS can be estimated in consideration of the diameter of the roll sheet RS by resetting the cumulative rotation amount measured by the first measurement unit 103 and the cumulative conveyance amount measured by the second measurement unit 104. In addition, the error between the diameter of the roll sheet RS calculated with Equation (1) and the true diameter of the roll sheet RS can be reduced by performing the filter process on the diameter of the roll sheet RS calculated with Equation (1). Thus, the label printer 1 can accurately estimate the remaining amount of the roll sheet RS.

The filter process is a moving average filter process.

In this manner, through the filter process of the moving average filter, the error between the diameter of the roll sheet RS calculated with Equation (1) and the true diameter of the roll sheet RS can be suppressed. In addition, by using the moving average filter process, the diameter of the roll sheet RS can be accurately determined at the timing for the estimation of the estimation unit 105. Thus, the label printer 1 can accurately estimate the remaining amount of the roll sheet RS at the timing for the estimation of the estimation unit 105.

The filter process is a Kalman filter process.

In this manner, through the filter process of the Kalman filter, the error between the diameter of the roll sheet RS calculated with Equation (1) and the true diameter of the roll sheet RS can be suppressed. In addition, by using the filter process of the Kalman filter, the diameter of the roll sheet RS can be accurately determined at the timing for the estimation of the estimation unit 105. In addition, by using the Kalman filter process, it suffices that at least the label printer 1 stores the remaining amount of the roll sheet RS estimated last time by the estimation unit 105, and it is not necessary to use a large storage region of the memory 110. Thus, the label printer 1 can accurately estimate the remaining amount of the roll sheet RS at the timing for the estimation of the estimation unit 105 while suppressing the increase of the use rate of the memory 110.

The feed mechanism 18 and the conveyance mechanism 19 are asynchronously driven.

In this manner, even when the difference between the diameter of the roll sheet RS calculated with Equation (1) and the true diameter of the roll sheet RS is a difference due to the asynchronous driving of the feed mechanism 18 and the conveyance mechanism 19, the difference can be suppressed. Thus, even with the label printer 1 in which the feed mechanism 18 and the conveyance mechanism 19 asynchronously drive, the remaining amount of the roll sheet RS can be estimated.

The label printer 1 includes the device control unit 101 that provides the notification of the remaining amount of the roll sheet RS estimated by the estimation unit 105.

In this manner, the user of the label printer 1 can determine the remaining amount of the roll sheet RS.

The estimation method of the label printer 1 includes a step of measuring the cumulative rotation amount of the roll sheet RS, a step of measuring the cumulative conveyance amount of the conveyance roll sheet RH, a step of estimating the remaining amount of the roll sheet R by using Equation (1) in which the measured cumulative rotation amount is REV, the measured cumulative conveyance amount is PF, and the diameter of the roll sheet RS is R, a step of resetting the measured cumulative rotation amount each time the remaining amount of the roll sheet RS is estimated or each time the remaining amount of the roll sheet RS is estimated multiple times, and a step of resetting the measured cumulative conveyance amount each time the remaining amount of the roll sheet RS is estimated or each time the remaining amount of the roll sheet RS is estimated multiple times. In the estimation method, the diameter of the roll sheet RS is calculated with Equation (1) in the estimating step, and the remaining amount of the roll sheet RS is estimated by performing the filter process on the calculated diameter of the roll sheet RS.

In this manner, effects similar to those of the label printer 1 described above can be achieved.

The above-described embodiment is only one specific example of the application of the present disclosure. The disclosure is not limited to the configurations of the above-described embodiment, but can be implemented in various forms to the extent that it does not depart from the gist of the disclosure.

For example, in the above-described embodiment, the label printer 1 is exemplified as a printing apparatus. However, the printing apparatus is not limited to the label printer 1. It suffices that the printing apparatus is an apparatus including the feed mechanism 18 that houses the roll sheet RS and feeds the roll sheet RS, and the conveyance mechanism 19 that conveys the conveyance roll sheet RH fed from the roll sheet RS. Specifically, the printing apparatus may be a large-format printer, a textile printer that performs textile printing, or the like.

While a serial-head type is exemplified as the printing head 2 in the above-described embodiment, a line-head type may also be adopted. In addition, the printing system of the printing head 2 is not limited to an ink-jet type.

In the above-described embodiment, the feed mechanism 18 includes the feed drive motor 5 and the supporting member 4. However, the feed mechanism 18 may include one or a plurality of rollers provided upstream of the feed control lever 6. The roller included in the feed mechanism 18 may be a rotation roller, a driven roller, or both. In addition, the feed mechanism 18 may include various types of power transmission mechanisms related to feeding of the conveyance roll sheet RH.

In the above-described embodiment, the conveyance mechanism 19 includes the conveyance drive motor 8 and the conveyance roller pair 7. However, the conveyance mechanism 19 may include one or a plurality of rollers provided downstream of the feed control lever 6. The roller included in the conveyance mechanism 19 may be a rotation roller, a driven roller, or both. In addition, the conveyance mechanism 19 may include various types of power transmission mechanisms related to the conveyance of the conveyance roll sheet RH.

Instead of the cutout 611, a hole, or a member that transmits light emitted by the irradiation unit 141, may be formed in the feed control plate 61.

In the above-described embodiment, the moving average filter process and the Kalman filter process are exemplified as the filter process performed by the estimation unit 105. However, the filter process performed by the estimation unit 105 is not limited to the two types of filter processes. For example, the estimation unit 105 may be configured to perform a filter process of a primary delay filter, or a filter process of a secondary delay filter.

The processor 100 may be composed of a single processor, or a plurality of processors. The processor 100 may be hardware programed to achieve the corresponding functional part. Specifically, the processor 100 may be composed of an application specific integrated circuit (ASIC), or a field programmable gate array (FPGA), for example.

In addition, the units of the label printer 1 illustrated in FIG. 4 are examples, and their specific mounting configurations are not limited. Specifically, it is not necessarily required to mount hardware individually corresponding to each unit, and it is naturally possible to adopt a configuration in which the function of each unit is achieved when one processor executes a program. In addition, a part of the function achieved by software in the above-described embodiment may be achieved by hardware, or a part of the function achieved by hardware may be achieved by software. Further, specific unit configurations of other units of the label printer 1 may also be arbitrarily changed.

In addition, for example, the units of steps of the operation illustrated in FIG. 5 are units divided in accordance with the main processing content for convenience of description of the operation of each unit of the label printer 1, and the present disclosure is not limited to the way of dividing the processing units and the names of the units. The units may be divided into a larger number of step units in accordance with the processing content. In addition, the units may be divided such that one step unit includes a larger number of processes. In addition, the order of the steps may be interchanged as appropriate to the extent that it does not interfere with the purpose of the disclosure.

What is claimed is:

1. A printing apparatus comprising:

a feed mechanism configured to feed a printing medium from a roll sheet by rotating the roll sheet;

a conveyance mechanism configured to convey the printing medium fed by the feed mechanism;

a printing unit configured to perform printing on the printing medium conveyed by the conveyance mechanism;

a first measurement unit configured to measure a cumulative rotation amount, the cumulative rotation amount being a cumulative value of a rotation amount of the roll sheet;

a second measurement unit configured to measure a cumulative conveyance amount, the cumulative conveyance amount being a cumulative value of a conveyance amount of the printing medium conveyed by the conveyance mechanism; and an estimation unit configured to estimate a remaining amount of the roll sheet by using the following Equation (1):

$$R=PF/(\pi \cdot REV) \quad \text{Equation (1)}$$

where the cumulative rotation amount measured by the first measurement unit is REV, the cumulative conveyance amount measured by the second measurement unit is PF, a diameter of the roll sheet is R, and $\pi$ is a ratio of a circumference of a circle to its diameter, wherein the first measurement unit resets the measured cumulative rotation amount each time the estimation unit estimates the remaining amount of the roll sheet or each time the estimation unit estimates the remaining amount of the roll sheet multiple times, the second measurement unit resets the measured cumulative conveyance amount each time the estimation unit estimates the remaining amount of the roll sheet or each time the estimation unit estimates the remaining amount of the roll sheet multiple times, and the estimation unit calculates the diameter of the roll sheet with the Equation (1), performs a filter process on the diameter of the roll sheet calculated, and estimates the diameter of the roll sheet subjected to the filter process as the remaining amount of the roll sheet.

2. The printing apparatus according to claim 1, wherein the filter process is a moving average filter process.

3. The printing apparatus according to claim 1, wherein the filter process is a Kalman filter process.

4. The printing apparatus according to claim 1, wherein the feed mechanism and the conveyance mechanism are asynchronously driven.

5. The printing apparatus according to claim 1, comprising a notification unit configured to provide a notification of the remaining amount of the roll sheet estimated by the estimation unit.

6. An estimation method of a printing apparatus, the printing apparatus including:

a feed mechanism configured to feed a printing medium from a roll sheet by rotating the roll sheet;

a conveyance mechanism configured to convey the printing medium fed by the feed mechanism; and a printing unit configured to perform printing on the printing medium conveyed by the conveyance mechanism, the estimation method comprising:

measuring a cumulative rotation amount, the cumulative rotation amount being a cumulative value of a rotation amount of the roll sheet;

measuring a cumulative conveyance amount, the cumulative conveyance amount being a cumulative value of a conveyance amount of the printing medium conveyed by the conveyance mechanism; and estimating a remaining amount of the roll sheet by using the following Equation (1):

$$R=PF/(\pi \cdot REV) \quad \text{Equation (1)}$$

where the cumulative rotation amount that is measured is REV, the cumulative conveyance amount that is measured is PF, a diameter of the roll sheet is R, and $\pi$ is a ratio of a circumference of a circle to its diameter;

resetting the measured cumulative rotation amount each time the remaining amount of the roll sheet is estimated or each time the remaining amount of the roll sheet is estimated multiple times; and resetting the measured cumulative conveyance amount each time the remaining amount of the roll sheet is estimated or each time the remaining amount of the roll sheet is estimated multiple times, wherein in the estimation, the diameter of the roll sheet is calculated with the Equation (1), a filter process is performed on the diameter of the roll sheet calculated, and the diameter of the roll sheet subjected to the filter process is estimated as the remaining amount of the roll sheet.

* * * * *